(12) United States Patent
Srinivas et al.

(10) Patent No.: US 11,727,819 B2
(45) Date of Patent: Aug. 15, 2023

(54) INTERACTIVE SYSTEM FOR TEACHING SEQUENCING AND PROGRAMMING

(71) Applicant: GRASP 10 INNOVATIONS PVT LTD., Bengaluru (IN)

(72) Inventors: Shanmugha Tumkur Srinivas, Bengaluru (IN); Vivek Pradeep Kumar, Bengaluru (IN); Jayakrishnan Kundully, Bengaluru (IN); Rahul Kothari, Bengaluru (IN); Rudresh Jayaram, Bengaluru (IN); Vineetha Menon, Bengaluru (IN); Nischitha Thulasiraju, Bengaluru (IN); John Solomon Johnson, Tirunelveli (IN)

(73) Assignee: GRASP IO INNOVATIONS PVT LTD., Bengaluru (IN)

( * ) Notice: Subject to any disclaimer, the term of this patent is extended or adjusted under 35 U.S.C. 154(b) by 629 days.

(21) Appl. No.: 16/622,851

(22) PCT Filed: Jun. 13, 2018

(86) PCT No.: PCT/IN2018/050389
§ 371 (c)(1),
(2) Date: Dec. 13, 2019

(87) PCT Pub. No.: WO2018/229797
PCT Pub. Date: Dec. 20, 2018

(65) Prior Publication Data
US 2020/0105153 A1    Apr. 2, 2020

(30) Foreign Application Priority Data

Jun. 15, 2017   (IN) .............................. 201741016968

(51) Int. Cl.
*G09B 19/00* (2006.01)
*G09B 1/32* (2006.01)
(Continued)

(52) U.S. Cl.
CPC ............. *G09B 1/325* (2013.01); *G06F 9/453* (2018.02); *G09B 5/08* (2013.01); *G09B 7/02* (2013.01); *G09B 19/0053* (2013.01)

(58) Field of Classification Search
CPC ..... G09B 1/325; G09B 19/0053; A63H 18/16
See application file for complete search history.

(56) References Cited

U.S. PATENT DOCUMENTS

| 9,047,886 B2 | 6/2015 | Kishimoto | |
|---|---|---|---|
| 2005/0026537 A1* | 2/2005 | Hsieh | A63H 33/08 446/330 |

(Continued)

FOREIGN PATENT DOCUMENTS

| CN | 102135429 A | 7/2011 |
|---|---|---|
| CN | 103885585 A | 6/2017 |

*Primary Examiner* — Peter R Egloff
(74) *Attorney, Agent, or Firm* — Maschoff Brennan

(57) ABSTRACT

The present disclosure discloses an interactive system for teaching sequencing and programming to children. In some embodiments, the interactive system comprises a plurality of tiles organisable to form a structural pattern, wherein each tile comprises an RFID tag storing at least a pre-defined command corresponding to a first action and an identifier associated with a second set of actions, and an interactive robot. In some embodiments, the interactive robot when placed on the tile is configured for, receiving a voice command from a user, reading at least the pre-defined command and the identifier from the RFID tag associated with the tile, comparing the command received from the user and the pre-defined command, and performing one or more actions from among a third set of actions based on a result of comparison.

8 Claims, 3 Drawing Sheets

(51) Int. Cl.
    *G06F 9/451*     (2018.01)
    *G09B 5/08*     (2006.01)
    *G09B 7/02*     (2006.01)

(56) References Cited

U.S. PATENT DOCUMENTS

| | | | | |
|---|---|---|---|---|
| 2011/0105205 | A1* | 5/2011 | Devecka | A63F 9/143 463/1 |
| 2014/0170633 | A1* | 6/2014 | Chong | G09B 5/062 434/379 |
| 2015/0364060 | A1* | 12/2015 | Gupta | B25J 9/0081 434/118 |
| 2016/0379519 | A1* | 12/2016 | Gupta | A63H 30/04 434/118 |
| 2017/0007915 | A1* | 1/2017 | Moscatelli | G09B 23/00 |
| 2017/0046965 | A1* | 2/2017 | Kamhi | G03B 29/00 |

\* cited by examiner

INTERACTIVE SYSTEM FOR TEACHING SEQUENCING AND PROGRAMMING

TECHNICAL FIELD

The present disclosure generally relates to computer programming education system and more particularly relates to interactive system for teaching sequencing and programming.

BACKGROUND

Often, learning programming is considered hard. Programming courses in universities usually have highest drop-out rates and often regarded as most difficult. However, some students learn to program easily and quickly while others have certain difficulties in adopting this kind of knowledge. Learning programming would be easier if the students would already be familiar with basic problem solving techniques and programming concepts, and it would be best if the basic concepts are taught in early age thus allowing children enough time to develop problem solving skills and logical thinking.

Currently, programming concepts are difficult to teach to children owing to their abstract nature besides the need for literacy and motor skills. Further, programming implicitly requires high level of abstraction, complexity around programming makes it a challenging topic to introduce to children and the concepts can be viewed by children as too difficult and not interesting enough. Moreover, children can only solve the problems associated with the real-world or something they can relate to.

However, proper usage of computers as an addition to standard teaching methods may help in enhancing the learning experience for children by presenting certain problems in a way that is appropriate for their age and in a way they can relate to real-world problems. Basic idea is to incorporate learning into something that children perceive as fun. By doing so, problems with lack of interest or misunderstanding of a problem could be easily avoided. Further, recent studies have shown that children are able to learn while playing games, both knowingly and unknowingly.

Currently, there exist various solutions in the market that introduce children to programming through visual and kinaesthetic methods. In visual methods, children are taught to program devices on devices such as tablets, computers or smartphones using approaches where children are asked to arrange blocks sequentially to create a set of instructions or code for the device/computer, or link visual objects corresponding to different blocks of the code, etc. These can include visual representation of actual instructions which the child can connect using simple actions such as drag, tap, press, etc.

On the other hand, in kinaesthetic method or tangible computing, physical objects such as blocks are provided to create programs to perform certain tasks. These can correspond to specific functions, such as a particular colored block to move forward, another color block to move left, a third colored block to move right and another to run the functions or the code. The child can arrange the blocks on the board and press the run block on the board to make the robot execute the functions in the order that the blocks have been arranged on the board.

SUMMARY OF THE DISCLOSURE

This summary is provided to introduce a selection of concepts in a simple manner that is further described in the detailed description of the disclosure. This summary is not intended to identify any key or essential inventive concepts of the subject matter, nor is it intended to determine or limit the scope of the disclosure.

The present disclosure discloses an interactive system for teaching sequencing and programming to children. In some embodiments, the interactive system comprises a plurality of tiles organisable to form a structural pattern, wherein each tile comprises an RFID tag storing at least a pre-defined command corresponding to a first action and an identifier associated with a second set of actions, and an interactive robot. In some embodiments, the interactive robot when placed on the tile is configured for, receiving a command from a user, reading at least the pre-defined command corresponding to the first action and the identifier from the RFID tag associated with the tile, comparing the command received from the user and the pre-defined command corresponding to the first action, and performing one or more actions from among a third set of actions based on a result of comparison, wherein the third set of actions comprises, executing the pre-defined command to perform the first action, decoding the identifier and performing one of the second set of actions, providing a feedback to the user, and re-initialization of the interactive robot. In a preferred embodiment, the first action corresponds to a movement of the interactive robot and the second set of actions comprises one of playing sounds, providing information, asking one or more questions, etc.

To further clarify some of the advantages and features of the present disclosure, a more particular description will be rendered by reference to specific embodiments thereof, which are illustrated in the appended figures. It may be appreciated that these figures depict only exemplary embodiments of the disclosure and are therefore not to be considered limiting of its scope. The disclosure will be described and explained with additional specificity and detail with the accompanying figures.

BRIEF DESCRIPTION OF THE FIGURES

Embodiments of the present disclosure will be described and explained with additional specificity and detail with the accompanying figures in which.

Figures 1A, 1B:
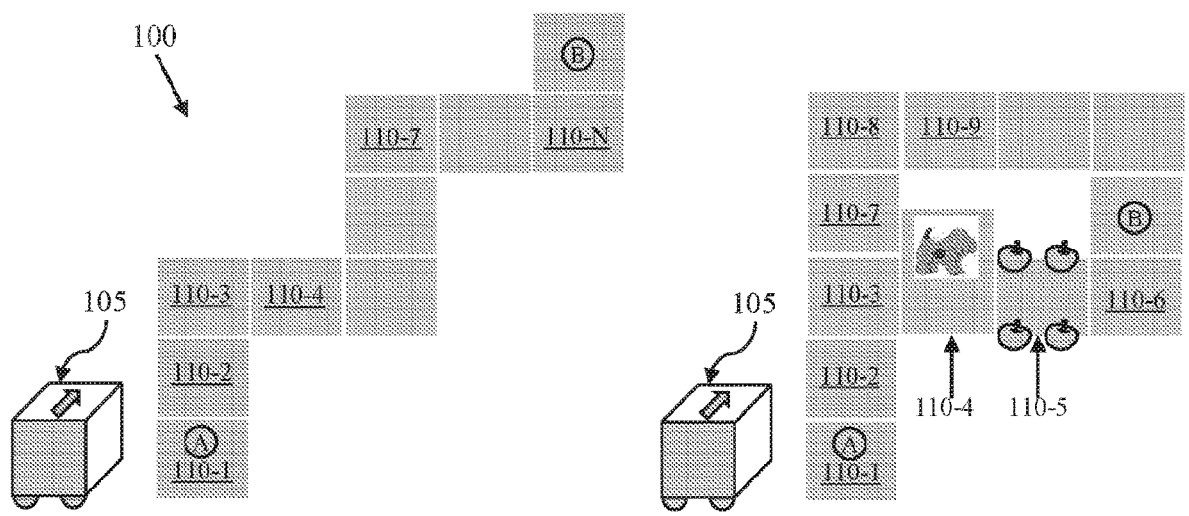
FIG. 1A illustrates an exemplary interactive system for teaching computational thinking—sequencing and programming to children in accordance with an embodiment of the present disclosure.
FIG. 1B illustrates an example map created using plurality of tiles in accordance with an embodiment of the present disclosure.

Further, skilled artisans/persons will appreciate that elements depicted in the figures are illustrated for simplicity and may not have necessarily been drawn to scale. Furthermore, in terms of construction of a device, one or more components of the device may have been represented in the figures by conventional symbols, and the figures may show only specific details that may be pertinent to understanding the embodiments of the present disclosure so as not to obscure the figures with details that will be readily apparent to those of ordinary skill in the art having the benefit of the description herein.

DETAILED DESCRIPTION OF THE EXEMPLARY EMBODIMENTS

For the purpose of promoting an understanding of principles of the disclosure, reference will now be made to the embodiments illustrated in the figures and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates. It will be understood by those skilled in the art that the foregoing general description and the following detailed description are exemplary and explanatory of the disclosure and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components. Appearances of the phrase "in an embodiment", "in another embodiment", "in one embodiment", "in a further embodiment", "in some embodiments", "in certain embodiments" and similar language throughout this specification may, but do not necessarily, all refer to the same embodiment.

Unless otherwise defined, all technical and scientific terms used herein have the same meaning as commonly understood by one of ordinary skill in the art to which this disclosure belongs. The system, methods, and examples provided herein are illustrative only and not intended to be limit the scope of the disclosure.

Embodiments of the present disclosure will be described below in detail with reference to the accompanying figures.

The present disclosure relates to interactive system for teaching computational thinking (sequencing and programming) to children, wherein the system comprises an interactive robot and a plurality of tiles or patches that may be arranged to create a map for the interactive robot (hereinafter referred as robot) to traverse on. The robot needs to move from one point (source) to a second point (destination) on the map created by the tiles. The robot may have any suitable form factor, but is preferably structured to represent a toy. Similarly, the plurality of tiles may have any suitable form factor, however a square shaped tile is considered in the present disclosure for better illustration and understanding.

In one embodiment of the present disclosure, the robot is configured to accept voice commands as input to solve a particular problem, for example to move from point "A" to point "B" on the map created by the plurality of tiles. In another embodiment of the present disclosure, each tile comprises a RFID tag in which a command/instruction corresponding to a first action is stored, wherein example first action may include but not limited to move forward, turn right, turn left, turn 45 degrees to the left, turn 45 degrees to the right, and the like. That is, the RFID tag stores at least a pre-defined command corresponding to the first action, wherein the first action corresponds to a movement of the interactive robot. In other words, the RFID tag on each tile corresponds to the instruction to be executed by the robot when the robot is on that tile.

In another embodiment, one or more tiles among the plurality of tiles comprises an identifier (encoded in RFID tag) associated with a second set of actions, wherein the second set of actions comprises playing sounds, providing information, asking one or more questions, etc. When the robot in on such tiles (herein after referred as marked tiles), the robot reads the RED tag to perform the first action or one of the second set of actions or both.

During operation, i.e., while teaching, a path from point "A" to point "B" is created using the tiles, by an instructor (parent or teacher), The path is created using plurality of tiles. Then the user (child) is asked to perform the task of moving the robot from point "A" to pint "B" by providing voice commands. When the robot detects a voice command, the robot converts the voice command into text and determines if there is a match with any of pre-defined command. If the command is recognized, then the robot compares the received command against the value (i.e., pre-defined command) received from the RFID tag of the tile, the tile on which the robot is currently present. Then, based on the result of comparison, the robot performs one or more actions from among a third set of actions, wherein the third set of actions comprises executing the pre-defined command to perform the first action, decoding the identifier and performing one of the second set of actions, providing a feedback to the user, and re-initialization of the interactive robot. For example, if the command matches, the robot executes pre-defined command to perform corresponding first action, for example moving a step forward. Additionally, if the tile is a marked tile, then the robot decodes the identifier and performs one of the second set of actions, for example, plays a pre-set sound. On the other hand, if the command received from the user does not match with the pre-defined command read from the tile, then the robot provides a feedback to the user, indicating an error, and re-initializes itself to move back to the initial position.

Hence, the interactive system disclosed in the present disclosure is configured to introduce young children (aged above 3 years) to computational thinking concepts including but not limited to sequencing and programming.

In some embodiments, a code mode is introduced. With this method, the process of solution of each map can be broken down into smaller parts based on the child's ability. The end of each set of steps is referred to as a check-point. For example—a 20 step map may be broken into smaller parts by setting the number of steps to be taken in one set. A set of instructions is orally given, one instruction at a time. This set of instructions is then executed once the pre-decided number of commands is received. Each set of instructions ends with a checkpoint. Any error in execution in a particular set of commands places the robot back at the previous checkpoint. This introduces children to decomposition—an important aspect of computational thinking where a bigger problem is broken down into smaller parts.

FIG. 1A illustrates an exemplary interactive system for teaching computational thinking—sequencing and programming to children in accordance with an embodiment of the present disclosure. The system 100 comprises an interactive robot 105 (hereinafter referred as robot 105) and plurality of tiles 110-1, 110-2 to 110-N which may be placed/organized to form a structure or map as shown.

In one embodiment of the present disclosure, each tile 110-1, 110-2 to 110-N comprises a RFD tag that stores pre-defined command that corresponds to a first action to be executed when the robot 105 is on the particular tile. For example, the RFIDs in the tiles 110-1 and 110-2 comprise command (pre-defined) for moving the robot 105 in forward direction. Similarly, the RFIDs in tile 110-3 and 110-7 comprise command for moving the robot 105 in right direction. In a preferred embodiment of the present disclosure, the directions are not visually indicated on the tile, however the directions may be indicated on the bottom side of the tile thereby enabling the instructor to place appropriate tiles while creating a path. Using such plurality of tiles, the instructor may create a simple path from point "A" to point "B" as shown, which provides a map based a problem statement to the child. Further, the instructor may create one or more paths to introduce the concept of shortest path calculation, conditional statements such as if, else, etc. In one implementation, NFC tags may be implemented to store the pre-defined commands and the identifier, and a NFC reader on the robot may be used read the same. Similarly, in some other implementations, the tiles may contain coloured strips encoding the pre-defined commands and the identifier, and the same can be detected by a colour sensor on the robot.

Upon creating the path as shown, the user (child) is asked to perform the task of moving the robot 105 from point "A" to point "B" by providing appropriate voice commands. For the given example, the appropriate instructions/commands are "forward-forward-right-forward-left-forward-right-forward-left". When the robot 105 detects a voice command from the user, the robot 105 converts the voice command into text and determines if there is a match with any of pre-defined commands. For example, front, forward, ahead, move front, move forward, etc., are pre-defined, and linked to the same command "forward" corresponding to an action of moving forward. When the user provides any of such commands, the robot 105 determines if there is a match with any of pre-defined command.

Upon recognizing the command received from the user, the robot 105 compares the received command against the value (i.e., pre-defined command) received from the RFD reader of the tile, the tile on which the robot is currently present. That is, the robot 105 reads the pre-defined command from the RFID tag of the tile on which the robot 105 is currently present, and compares the read pre-defined command with the command received from the user. As described, the pre-defined command corresponds to the first action to be performed by the robot 105. If the command received from the user and the command read from the RFID tag matches, the robot 105 perform the corresponding first action, for example moving a step forward, else the robot alerts the user that an error has occurred. In one example, considering that the robot 105 is on tile 110-1, if the user gives a command "move front", the robot 105 checks the received command against the pre-defined command read from the RFID tag of the tile 110-1 and executes the command to move the robot 105 one step from tile 110-1 to tile 110-2.

In another example, considering that the robot 105 is on tile 110-3, if the user gives a command "move front", the robot 105 checks the received command against the pre-defined command read from the RFID tag of the tile 110-1 which indicates "move right". Since, there is a mismatch between the command received by the user and the pre-defined command read from the RFID tag (actual command to be executed), the robot 105 then provides an error message to the user indicating improper command. Hence, the system 100 provides feedback to the user when the robot 105 is on the incorrect path and introduces sequential programming and logical thinking to young children in an interactive way.

FIG. 1B illustrates an example map created using plurality of tiles in accordance with an embodiment of the present disclosure. As shown, the map is created using one or more tiles that are used in creating the map illustrated in FIG. 1A. Hence, the plurality of tiles may be modularly reused to create various types of maps/structures that introduce various types of sequencing and programming concepts to the children. In one embodiment of the present disclosure, coloured or numbered tiles may be used to teach conditional programming concepts. For example, considering tile 110-3 as a red tile, the instructor may ask the child to move forward till the red tile and then take a right on the red tile. Thereby introducing conditional programming concepts such as for loop, while, if/else, etc. to the children.

As described, the instructor may user one or more marked tiles while creating the map. Referring to FIG. 1B, the map comprises two marked tiles 110-4 and 110-5, wherein each marked tile comprises an identifier (encoded in RFID tag) associated with the second set of actions, for example, playing dog barking sound, playing a question such as "How many apples are in the picture?". Further, the marked tile may comprise visual indicators associated with the second set of actions as shown. During operation, when the robot 105 reaches the marked tile 110-4, the robot 105 reads the pre-defined command and the identifier associated with the second set of actions from the MD tag. Then the robot 105 compares the command received from the user and the pre-defined command read from the RFID tag as described. Further, the robot decodes the identifier associated with the second set of actions and plays dog barking sound and asks the user to identify the animal. Similarly, when the robot 105 is on the marked tile 110-5, the robot 105 reads the identifier and plays a question "How many apples are in the picture?" In one implementation, the robot 105 is configured to move further only if the user provides the correct response to the second set of actions, for example if the user provides the right answer to the question. In other words, in addition to correctly identifying the direction that the robot 105 should take when on the marked tile, the child would also need to correctly answer a question corresponding to the marked tile, to unlock robot 105 in order to move ahead. This can also be used to teach children additional concepts like object recognition, counting, etc.

Hence, the interactive system disclosed in the present disclosure enables the instructor to use question prompts and the corresponding answer prompts of their choice for the tiles. The RFID tag can contain an identifier which is in turn mapped to a question-answer pair. So, when the robot reaches such marked tile, the robot reads the RFID tag and asks the question linked to the identifier corresponding to that particular marked tile. Then the robot 105 waits for the child to answer the question. The received answer is then matched against the answer linked to the identifier of the RFID of the marked tile. When the child's answer matches with that corresponding to the marked tile's RFID tag, the marked tile is unlocked for the robot 105 and the robot 105 may proceed with traversing the tiles of the map based on future instructions. In some other implementations, the identifier may be linked to a question-answer pair or to a library comprising a set of question answer pairs from which a pair may be chosen by the robot 105 randomly. That is, when the robot 105 is on that particular marked tile, the robot reads the RFD tag (identifier), and reads the question corresponding to that identifier or reads one of the many questions in case the identifier points to a collection of questions (library). Upon receiving the answer from the user, the robot 105 converts the same to text and compares same with the answer recorded in the library. If the answer matches, the marked tile is unlocked for the robot 105 and the robot 105 may proceed with traversing the tiles of the map based on future instructions. Else, a feedback is provided to the user, and optionally the robot is re-initialized.

This provides an opportunity to include a variety of topics for learning. Parents/educators may set question-answer maps by configuring the tiles. The questions may be selected from a collection each question with a corresponding answer. All the questions and answers are linked to (and invoked by) the identifier stored in the RFID tag of the tile. This way, the configurable tile can be used to set any question and any answer for its unlocking.

In another embodiment, the marked tile may not contain any visual indicator, but instead coded to indicate that the tile is a marked tile, when the robot 105 is on that particular marked tile. In such a scenario, the robot 105 decodes the identifier (that the identifier associated with the second set of actions) and displays the visual indicator on its interactive graphical display and/or projects the visual indicator sideways on the marked tile. In one implementation, an instructor may download and install a dedicated mobile application using the instructor may configure the visual indicators to be displayed when the robot 105 is on the marked tiles. For example, if the category 'animals' is selected, whenever the robot 105 finds itself on a marked tile, the robot 105 projects one of the images from the category 'animals' There may be a collection of such categories such as colors, shapes, questions, etc. Such implementation eliminates the challenges and limitations posed by the use and purchase of special tiles. Further, the mobile application may be used to upload the images (one of the visual indicator) which may then be projected by the robot 105 when on a marked tile. Hence, no purchase of marked tile is needed, and also increases the scope of usage of the marked tiles as the robot 105 may display any image from image library.

Figure 2:
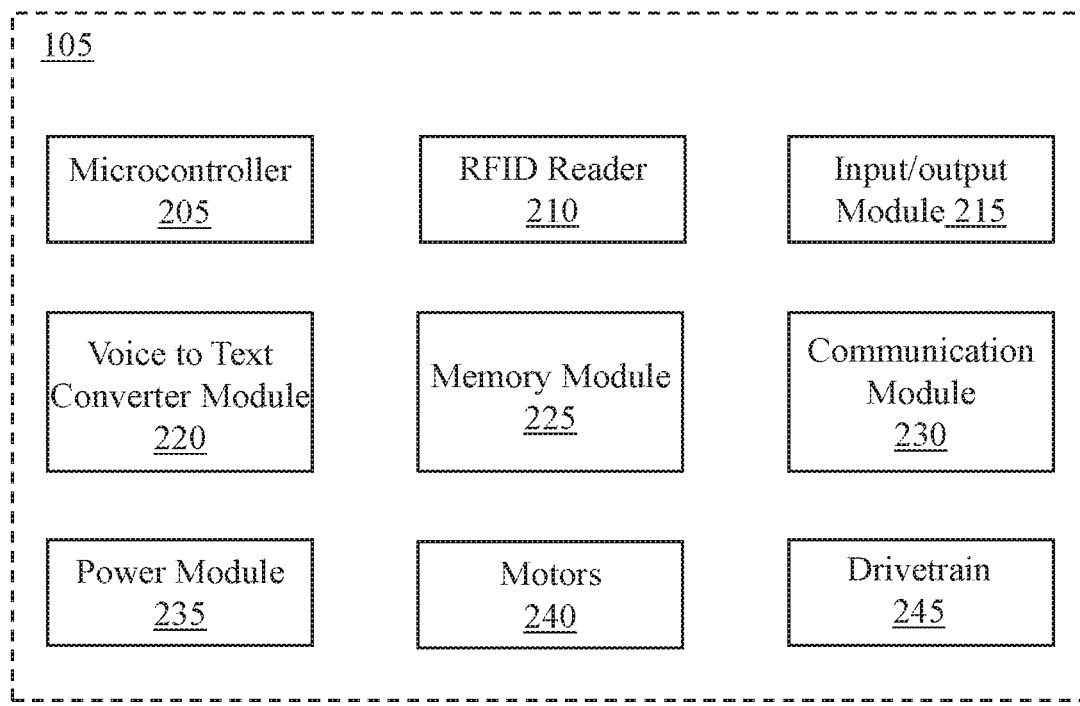
FIG. 2 is a block diagram of an exemplary robot in accordance with an embodiment of the present disclosure.

FIG. 2 is a block diagram of an exemplary robot in accordance with an embodiment of the present disclosure. As shown, the robot 105 comprises a microcontroller 205, a RFID reader 210, input/output (110) module 215, a voice to text converter module 220 and a memory module 225 in accordance with an embodiment of the present disclosure. Further, the robot 105 comprises other essential functional elements such as power module 230, motors 235, drivetrain 240, etc. configured for operating the robot 105 as well known in the art.

In one embodiment of the present disclosure, the I/O module 215 comprises one or more microphones, an interactive graphical display and optionally, a projector. When the user provides a voice command, the one or more microphones converts the voice command into digital data and the digital data is fed to the voice to text converter module 220 for further processing. In one embodiment of the present disclosure, the voice to text converter module 220 converts the received digital data into text, i.e., the voice to text converter module 220 coverts the voice commands into text.

Then the microcontroller or microprocessor 205 compares the text (representing received voice command) with the one or more pre-defined/pre-stored commands to determine if there is a match. In one embodiment of the present disclosure, the one or more pre-defined commands, or words, are stored in the memory module 225 and linked to one action. As described, front, forward, ahead, move front, move forward, apple, green, etc., are pre-defined, and recorded in the memory module 225, and linked to the same command "forward" corresponding to the first action "move forward". In an alternate embodiment of the present disclosure, the text is communicated to a cloud server through the communication module 230 for comparison and determination of a match and a result is obtained from the cloud server for further processing.

Further, the microcontroller or microprocessor 205 read the command from the RFID tag of the tile, the tile on which the robot 105 is currently present, using the RFID reader 210. Then the microcontroller or microprocessor 205 compares the received command (received from the user) against the value (i.e., command) received from the RFID tag of the tile. Based on the result of comparison, the microcontroller 205 performs one or more actions from among the third set of actions, wherein the third set of actions comprises, executing the pre-defined command to perform the first action, decoding the identifier and performing one of the second set of actions, providing a feedback to the user, and re-initialization of the interactive robot. For example, if there is a match between the command received from the user and the pre-defined command read from the RFID tag, then the pre-defined command is executed to perform first action which corresponds to a movement of the interactive robot 105. That is, the microcontroller or microprocessor 205 triggers the motor 240 which in turn drives the drivetrain 245 to move the robot 105 in a direction indicated by the user. On the other hand, if there is a mismatch in the command, an error message is displayed through the I/O module 215. In a preferred embodiment of the present disclosure, an error may be indicated by turning ON one or more LEDs thereby eliminating the need for any interaction with a screen, thus eliminating the need for a minimum level of reading ability, in its target users.

In one embodiment of the present disclosure, the system 100 may be operated in learn and play modes. In learning mode, the robot 105 accepts and executes the instructions one by one. Referring back to FIG. 1, considering the robot 105 is on tile 110-1, if the user gives a command to move forward, the robot 105 executes the command to move from tile 110-1 to tile 110-2 and waits for the next instruction from the user. On the other hand, in play mode, all instructions have to be given at once, and the user executes them together as a program by pressing a button on the robot 105 or by providing a dedicated voice command.

In some embodiments, a code mode is introduced. With this method, the process of solution of each map can be broken down into smaller parts based on the child's ability. That is, considering a twenty step map, the map is divided into five parts by introducing four checkpoints, wherein the checkpoints are marked tiles where the robot waits for pre-defined number of instructions. A set of instructions/commands (for example 4) is orally given, one instruction at a time. This set of instructions is then executed and hence each set of instructions ends with a checkpoint. Any error in execution in a particular set of commands places the robot back at the previous checkpoint. This introduces children to decomposition—an important aspect of computational thinking where a bigger problem is broken down into smaller parts.

Figure 3:
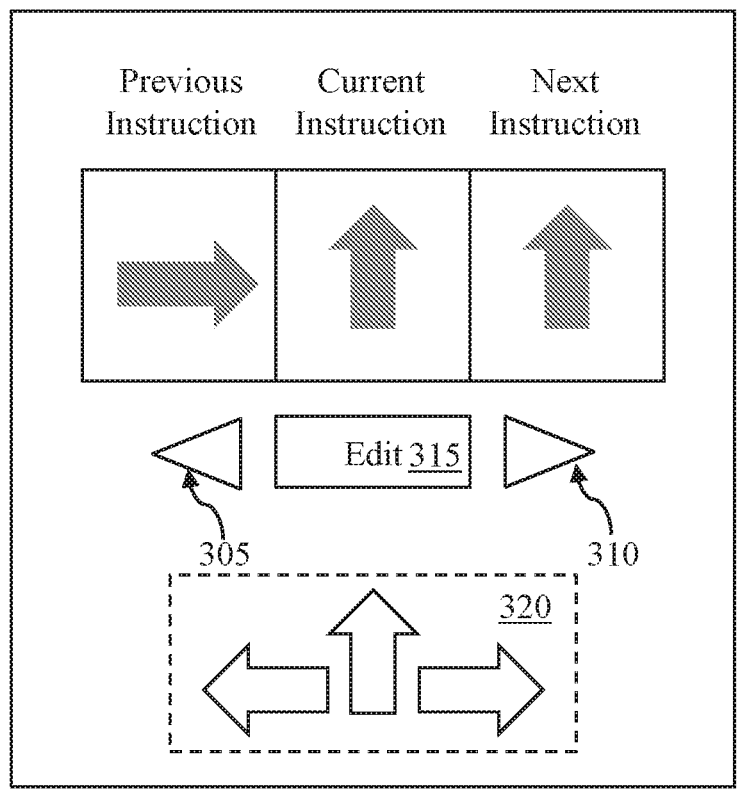
FIG. 3 illustrates an exemplary interactive display of the robot 105 for correcting error in accordance with an embodiment of the present disclosure.

FIG. 3 illustrates an exemplary interactive display of the robot 105 for correcting error in accordance with an embodiment of the present disclosure. As described, if the user provides an invalid voice command, an error message is displayed to the user. Alternatively, the robot 105 may be configured to provide an audio feedback or alert when the robot 105 receives an invalid command. When an error occurs, the user may use the interactive display to correct the errors. The user may use the arrow keys 305 and 310 to scroll through the list of instructions/commands given to the robot. Further, the user may user the edit button 315 to replace the error command with other options (front, left, right, etc.) from the selection menu 320. In a preferred embodiment, the user may change the voice command to correct the errors.

Hence, the present disclosure discloses an interactive system which uses series of voice commands, thus introducing sequencing and programming in addition to problem solving and logical thinking to young children in an interactive way. Further, the instructions are not dependent on syntax or written commands which demand basic level of reading ability, but instead the child's ability to speak and give oral instructions to the device. Further, voice integration and usage addresses the current gap between tactile play and literacy-based/dependent activities.

Furthermore, the usage of RFID tags provides a pocket friendly solution to provide feedback to the user when the robot is on the incorrect path. Further, the structure of map created by the tiles may be modified by introducing colors, shapes, etc. to create complex tasks.

While specific language has been used to describe the disclosure, any limitations arising on account of the same are not intended to limit the scope of the embodiments of the present disclosure. As would be apparent to a person skilled in the art, various working modifications may be made to the method and/or the system in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

We claim:

1. An interactive system for teaching sequencing and programming to a user, the interactive system comprising:
   a plurality of tiles organisable to form a two-dimensional structural pattern, wherein each tile comprises, an RFID tag storing at least a predefined command for a first action, wherein a tile among the plurality of tiles comprises an identifier associated with a second set of actions; and
   an interactive robot, when placed on one of the plurality of tiles, is configured for:
      receiving a voice command from the user;
      reading the predefined command corresponding to the first action which corresponds to a movement of the interactive robot and the identifier for the second set of actions if the tile comprises the identifier, from the RFID tag of the tile on which the interactive robot is placed;
      comparing the voice command received from the user with the predefined command for the first action; and
      based on a result of the comparison, performing one or more actions from among a third set of actions, wherein the third set of actions comprises, executing the predefined command for the first action, decoding the identifier and performing one of the second set of actions, providing feedback to the user, and re-initialization of the interactive robot.

2. The interactive system as claimed in claim 1, wherein one or more tiles among the plurality of tiles comprises one or more visual indicators associated with the second set of actions.

3. The interactive system as claimed in claim 1, wherein the one or more tiles among the plurality of tiles and the interactive robot are user configurable.

4. The interactive system as claimed in claim 1, wherein performing the one or more actions from among the third set of actions based on the result of comparison comprises:
   executing the predefined command to perform the first action if there exists a match between the command received from the user and the predefined command read from the RFID tag;
   otherwise, providing the feedback to the user, and re-initializing the interactive robot.

5. The interactive system as claimed in claim 1, wherein performing the one or more actions from among the third set of actions based on the result of comparison comprises:
   decoding the identifier and performing one of the second set of actions if there exists a match between the command received from the user and the predefined command for the first action read from the RFID tag;
   otherwise, providing the feedback to the user, and re-initializing the interactive robot.

6. The interactive system as claimed in claim 5, wherein one of the second set of actions comprises projecting a visual indicator on the one or more tiles from among the plurality of tiles.

7. The interactive system as claimed in claim 1, wherein the interactive robot comprises:
   an input/output module configured for receiving the voice command from the user;
   a RFID reader configured for reading the predefined command corresponding to the first action which corresponds to a movement of the interactive robot and the identifier for the second set of actions if the tile comprises the identifier, from the RFID tag of the tile on which the interactive robot is placed; and
   a microcontroller, wherein the microcontroller is configured for:
   comparing the voice command received from the user and the predefined command for the first action; and
   performing one or more actions from among the third set of actions based on the result of comparison, wherein the third set of actions comprises, executing the predefined command for the first action, decoding the identifier and performing one of the second set of actions, providing a feedback to the user, and re-initialization of the interactive robot.

8. The interactive system as claimed in claim 7, wherein the input/output module comprises at least a microphone for receiving voice command from the user.

* * * * *